W. L. ISBILLS.
PICTURE CARRIER FOR USE IN CONNECTION WITH PROJECTOR LANTERNS.
APPLICATION FILED OCT. 23, 1917.
1,260,673.
Patented Mar. 26, 1918.
2 SHEETS—SHEET 1.
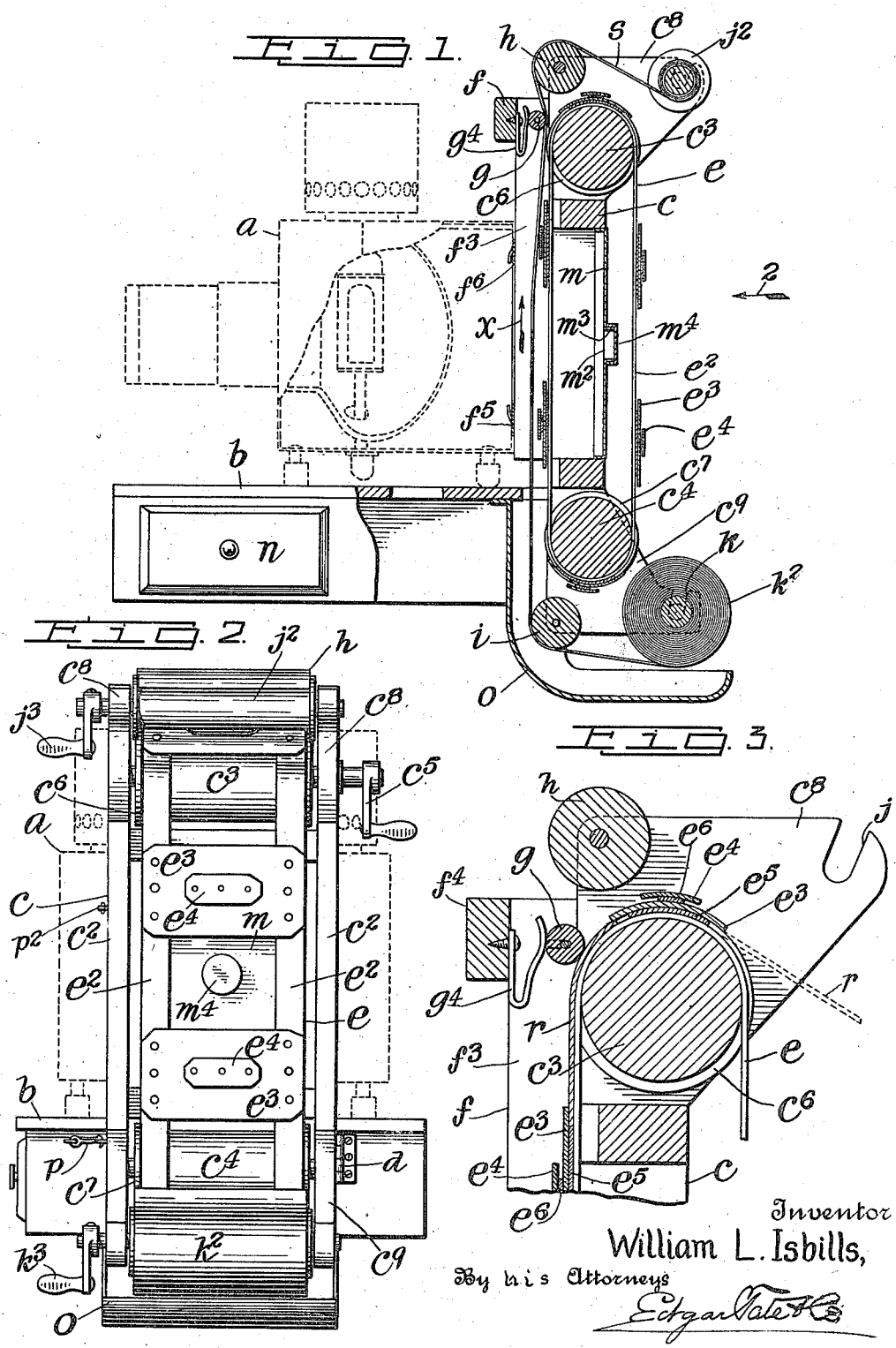
Inventor
William L. Isbills,
By his Attorneys

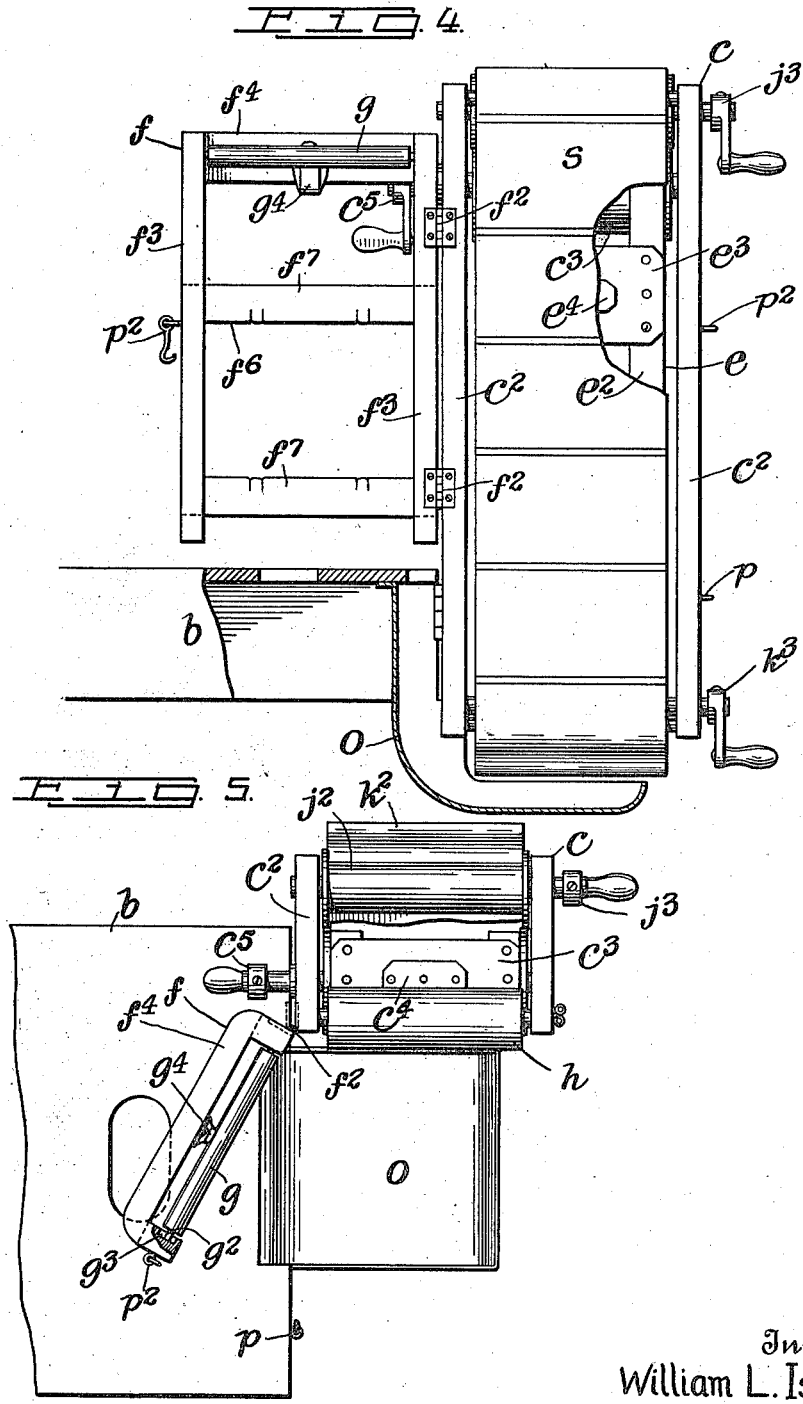

UNITED STATES PATENT OFFICE.

WILLIAM L. ISBILLS, OF BAYONNE, NEW JERSEY.

PICTURE-CARRIER FOR USE IN CONNECTION WITH PROJECTOR-LANTERNS.

1,260,673.   Specification of Letters Patent.   Patented Mar. 26, 1918.

Application filed October 23, 1917. Serial No. 198,067.

*To all whom it may concern:*

Be known that I, WILLIAM L. ISBILLS, a citizen of the United States, and residing at Bayonne, in the county of Hudson and State of New Jersey, have invented certain new and useful Improvements in Picture-Carriers for Use in Connection with Projector-Lanterns, of which the following is a specification, such as will enable those skilled in the art to which it appertains to make and use the same.

This invention relates to what are known as projector lanterns for use in projecting pictures onto a screen for exhibition or other purposes, and the invention more particularly relates to means for supporting or holding the pictures in connection with a lantern body; and the object of the invention described and claimed herein is to provide a device or apparatus of this class, independent of the lantern in construction, but adapted to be placed in connection with the body of the lantern, and which may be mounted in different positions with reference to the body of the lantern according to the construction and operation thereof, and by means of which separate or independent pictures may be exhibited when desired, thus giving the operator the power of selection, or determining what pictures will be exhibited; and whereby what are known as panoramic pictures or pictures united in the form of a flexible strip may be exhibited, when desired, in the manner of other devices of this class; and with these and other objects in view the invention consists in a device or apparatus of the class specified, constructed and operating as hereinafter described and claimed.

The invention described and claimed herein is an improvement on that described and claimed in a prior application filed by me March 6, 1917, Serial No. 152,470, and said invention is fully disclosed in the following specification, of which the accompanying drawings form a part, in which the separate parts of my improvement are designated by suitable reference characters in each of the views, and in which;

Figure 1 is a side view indicating the method of using my improvement in connection with a wellknown form of projector lantern, or what is called a "radiopticon," in which the picture holder and carrier is placed at the back of the lantern, the lantern being indicated in dotted lines and the picture holder and carrier in section;

Fig. 2 a view looking in the direction of the arrow 2 of Fig. 1;

Fig. 3 a view similar to Fig. 1 but showing only a part of the construction and on an enlarged scale;

Fig. 4 a view similar to Fig. 1 but showing two parts of the picture holder and carrier in different positions, or at right angles to the position shown in Fig. 1; and, Fig. 5 a plan view of the construction as shown in Fig. 4 with one of the parts in a different position.

In Fig. 1 of the accompanying drawing, I have indicated at $a$ a wellknown form of projector lantern known to the trade as a "radiopticon," and with this form of lantern my improved picture holder and carrier is placed at the back of the lantern as in the application hereinbefore referred to, but my invention is not limited to this use of the picture holder and carrier which use depends upon the form, construction and operation of the lantern, and the holder and carrier may be used in connection with what is known as a "balopticon" lantern in which case the holder and carrier will be placed beneath the lantern, as shown and described in the application referred to, but the invention described and claimed herein is not limited to any particular method of using the same.

In the construction shown, the picture holder and carrier comprises a frame or support consisting of a horizontal box-shaped base portion $b$ and an upright back frame portion $c$ connected with said base portion, and in the use of this form of my improved picture holder and carrier the lantern is placed on the base portion and abuts against the back portion so that said back portion will be in contact with, or in juxtaposition with the lantern, and said back portion is hinged to the base portion $b$ at $d$, and may be swung into position for use whenever desired, as shown in Figs. 1 and 2, or may be turned outwardly or laterally and backwardly on its hinge as and for the purpose hereinafter described.

The upright frame or back portion $c$ is composed of parallel side members $c^2$ in the opposite ends of which, or at the top and bottom of which, are mounted a driving roller $c^3$ and a driven roller $c^4$, and the driving roller $c^3$ is provided with a crank $c^5$.

Mounted on the rollers $c^3$ and $c^4$ is an endless carrier $e$ composed, in the construction shown, of side belts $e^2$ connected at spaced intervals by transverse flexible picture holding strips $e^3$ which are secured thereto and with which are connected transverse picture attaching clips $e^4$, and placed between the belt members $e^2$ and the picture holding strips $e^3$ are sheets $e^5$ of less transverse width than the strips $e^3$, and placed between the attaching clips $e^4$ and the strips $e^3$ are other sheets $e^6$ of less transverse width than said clips $e^4$, and the sheets $e^5$ and $e^6$ serve to offset the opposite side edge portions, or the top and bottom edge portions of the strips $e^3$ and the clips $e^4$, as clearly shown in Figs. 1 and 3 to permit of the insertion between the strips $e^3$ and the belt members $e^2$, and the clips $e^4$ and the strips $e^3$ of pictures, as hereinafter described, and the endless belt members $e^2$ are held in position on the rollers $c^3$ and $c^4$ by end flanges $c^6$ and $c^7$.

I also provide a supplemental back frame $f$ which is hinged to the front of the frame $c$ at $f^2$ and comprises side members $f^3$ and a top transverse member $f^4$, and with the bottom part of which is connected a picture supporting device $f^5$, consisting of a plate having a large central aperture $f^6$ and transverse top and bottom clip members $f^7$ between which a picture to be exhibited may be inserted, when desired.

The supplemental back frame member $f$ is provided in the top thereof with a roller $g$ having end trunnions $g^2$ movable in slots $g^3$ in the frame member $f^4$, and a spring $g^4$ is secured to the frame member $f^4$ and bears on the roller $g$.

The main frame $c$ is provided at the top and bottom thereof with extensions $c^8$ and $c^9$ in the front portions of which are mounted rollers $h$ and $i$, and the upwardly directed extension $c^8$, or the side portions thereof, are provided, rearwardly of the roller $h$, with recesses $j$ adapted to receive the trunnions of a spool $j^2$, and the downwardly directed extension $c^9$, or the side portions thereof, are provided, rearwardly of the roller $i$, with recesses $k$ adapted to receive the trunnions of a spool $k^2$, and the spool $j^2$ is provided with a crank $j^3$ and the spool $k^2$ with a crank $k^3$.

The central part of the frame $c$ is open and is closed by a back plate $m$ having a central opening $m^2$ provided with a projecting collar $m^3$ and the opening $m^2$ is provided with a closure device, consisting of a detachable cap $m^4$, and in the use of this device a watch may be inserted into the space formed by the collar $m^3$ so as to exhibit the time on the screen, or any other article which it is desired to exhibit may be similarly manipulated.

The base frame member $b$ is provided, in the construction shown, with a drawer $n$ in which pictures or other articles may be stored, and at the back thereof is secured a pan $o$ adapted to receive pictures which are automatically discharged from the endless carrier device in the operation of the apparatus as hereinafter described.

The free side portion of the main frame $c$ of the picture holder and carrier device may be connected with the base or support $b$ by suitable fastening devices $p$, and the corresponding side of the supplemental frame member $f$ may be connected with the main frame member $c$ by similar fastening devices $p^2$, and when the apparatus is in use these parts are connected and are held in the position shown in Figs. 1, 2 and 3, but said parts may be swung into the positions shown in Figs. 4 and 5.

It will be observed that the top, bottom and back portions of the carrier device are entirely exposed when said device is in use as shown in Figs. 1, 2 and 3, and in the operation of the device for exhibiting separate or independent pictures or picture cards, the operator may insert one side edge of a picture card $r$ as shown in dotted lines in Fig. 3 beneath one edge of one of the holding strips $e^3$ and then turn the endless carrier by means of the crank $c^5$, and as said carrier turns the picture card $r$ will move into the position shown in full lines in Fig. 3, and the roller $g$ which bears thereon will force the opposite side edge of the card beneath the corresponding side edge of the next successive strip $e^3$ on the endless belt carrier device, and the card $r$ will be exhibited on the screen in the usual manner and as will be readily understood.

The object of providing the picture holding strips $e^3$ and clips $e^4$ is to enable the operator to show picture cards of different dimensions, as in the prior application hereinbefore referred to, and the operation of the device or apparatus described and claimed herein for the purpose of exhibiting separate pictures will be the same as that of the apparatus described and claimed in said prior application, and one edge of the picture cards may be inserted by the operator beneath one edge of either of the parts $e^3$ or $e^4$, and the opposite edge of the picture card will be passed beneath the corresponding edge of the next successive parts $e^3$ or $e^4$ by the roller $g$, according to the dimensions of the card, and as the carrier is rotated the picture cards will be automatically discharged into the pan $o$, this operation being effected by reason of the fact that, as the endless carrier passes over the bottom roller $c^4$ the bending of the picture cards which are, of course, flexible will automatically detach said cards from either the clips $e^4$ or the strips $e^3$ with which they may be engaged as will be readily understood.

The foregoing description of the operation of my improved picture holder and carrier relates only as will be understood to the exhibition of separate cards or pictures, and by means of the construction and operation described, the operator is given the power of selection, or the power of determining at any and all times what picture or pictures he will exhibit on the screen; but as herein set out, this improvement is also intended for use in exhibiting panoramic pictures, or pictures connected or formed into a long flexible sheet, and in the use of my improved picture holder and carrier for this purpose, the picture sheet $s$ may be wound on the spool $k^2$ which is mounted in the bottom extension $c^9$ of the frame $c$, and one end of said picture strip is passed around the roller $i$ then up around the roller $h$ and connected with the spool $j^2$, and in this operation the frame members $c$ and $f$ are swung into the position shown in Figs. 4 and 5, after which said frame members may be swung back into their operative positions as shown in Figs. 1, 2 and 3, and the pictures on the sheet $s$ may be successively exhibited by turning the crank $j^3$ intermittently as will be readily understood.

The pictures on the strip or sheet $s$ may be of any character and may be so arranged as to tell a story of any kind or class, or may be strictly panoramic in character so as to represent geographic or other pictures, and by means of my improvement the operator may change at any time from the exhibition of separate or detached pictures to the exhibition of continuous or panoramic pictures connected in the form of a flexible strip or sheet, and by means of the picture supporting device $f^5$ which is connected with the supplemental frame member $f$, large stiff or rigid pictures may be exhibited at the will of the operator, it being understood that the pictures to be connected with the endless belt carrier device must be what are known as soft or flexible card pictures which will bend freely without breaking or tearing.

With the arrangement of the spools $j^2$ and $k^2$ and the strip or sheet $s$ as shown in Fig. 1, said strip or sheet is moved in the direction of the arrow $x$ in said figure, but the position of the spools $j^2$ and $k^2$ may be reversed in which case the direction of the movement of the strip or sheet $s$ will be the reverse of that of the arrow $x$, and when the parts of the holder and carrier are in the position shown in Fig. 1, the roller $g$ bears on the strip or sheet $s$ and serves to take up any slack therein and to regulate the movement thereof, and from the foregoing description it will be seen that the endless picture carrier mounted in connection with the frame $c$ may be used separately when exhibiting separate or independent pictures at the will of the operator whenever desired, or that part of the apparatus necessary for exhibiting pictures in the form of a flexible strip or sheet, or what is known as panoramic views may be instantly added to the apparatus when necessary or desirable, or pictures mounted on, or formed on, stiff or rigid material may be inserted into the picture holding device $f^5$ whenever it is desired to exhibit such pictures.

While I have shown and described my improved picture holder and carrier as mounted at the back of a projector lantern and have also stated that it may be mounted at the bottom of lanterns of this class according to the construction and operation of the lantern, my invention is not limited to the mounting of the holder or carrier in a vertical position at the back of the lantern, as shown and described herein, and the said picture holder and carrier may be mounted in a horizontal position at the back of the lantern, if desired, in order to produce on the screen continuous pictures, or a series of pictures relating to any subject-matter, or a panoramic view of natural scenery, such as is observed from a moving object or vehicle, and while I have shown and described the construction which I prefer in carrying out the object in view, my invention is not limited to the details of construction herein shown and described, and changes therein and modifications thereof may be made, within the scope of the appended claims, without departing from the spirit of the invention or sacrificing its advantages.

Having fully described my invention, what I claim as new and desire to secure by Letters Patent, is:—

1. A picture holder and carrier device for use in connection with a projector lantern, said device being independent of the lantern in construction and being adapted to be connected therewith, and comprising an endless picture carrying device for use in exhibiting separate, independent pictures, and means whereby panoramic pictures connected in the form of a flexible strip or sheet may be exhibited in place of the separate or independent pictures.

2. A picture holder and carrier device for use in connection with a projector lantern, said device being independent of the lantern in construction and being adapted to be connected therewith, and comprising means whereby either separate, independent pictures may be exhibited at the will of the operator or pictures connected in the form of a flexible strip or sheet.

3. A picture holder and carrier device for use in connection with a projector lantern, and comprising an endless carrier with which separate pictures may be connected by hand at the will of the operator, and means whereby pictures united in the form of a flexible strip may be substituted for the separate, independent pictures and exhibited.

4. A picture holder and carrier device for use in connection with a projector lantern, said device being independent of the lantern in construction but being adapted to be used in connection therewith, and comprising a main frame having an endless carrier with which separate, independent pictures may be connected by hand, a supplemental frame movably connected with the main frame and provided with a roller which operates in connection with the endless carrier, and means whereby pictures in the form of a flexible strip or sheet may be exhibited instead of the separate or independent pictures.

5. In a device of the class described, a main frame, an endless carrier mounted therein, and a supplemental frame movably connected with the main frame and provided with a spring-controlled roller which operates in connection with said frame.

6. In an apparatus of the class described, a main frame, rollers mounted in the top and bottom parts thereof, an endless belt carrier mounted on said rollers, other rollers mounted above and below the first-named rollers, and spools detachably mounted rearwardly of the last named rollers.

7. A picture holder and carrier device for use in connection with a projector lantern, said device being independent of the lantern in construction but being adapted to be used in connection therewith, and comprising a main frame, an endless belt carrier mounted therein, and in connection with which separate or independent pictures may be mounted for exhibition, means for mounting and moving a flexible strip or sheet of pictures in front of the endless carrier and a supplemental frame hinged to the main frame and provided with a spring-controlled roller which is adapted to operate both in connection with the endless belt carrier and in connection with the picture sheet or strip.

8. A picture holder and carrier device for use in connection with a projector lantern, and comprising a main frame, an endless belt carrier mounted therein, and in connection with which separate or independent pictures may be mounted for exhibition, means for mounting and moving a flexible strip or sheet of pictures in front of the endless carrier and a supplemental frame hinged to the main frame and provided with a spring-controlled roller which is adapted to operate both in connection with the endless belt carrier and in connection with the picture sheet or strip.

In testimony that I claim the foregoing as my invention I have signed my name in presence of the subscribing witnesses this 19th day of October, 1917.

WILLIAM L. ISBILLS.

Witnesses:
H. E. THOMPSON.
C. E. MULREANY,